Nov. 3, 1959  H. E. CANN, SR  2,910,965
MILKING SYSTEM FOR DOMESTIC ANIMALS
Filed Feb. 6, 1958  5 Sheets-Sheet 1

INVENTOR:
HARRY E. CANN, SR.
BY
Howson & Howson
ATTYS

Nov. 3, 1959 H. E. CANN, SR 2,910,965
MILKING SYSTEM FOR DOMESTIC ANIMALS
Filed Feb. 6, 1958 5 Sheets-Sheet 2
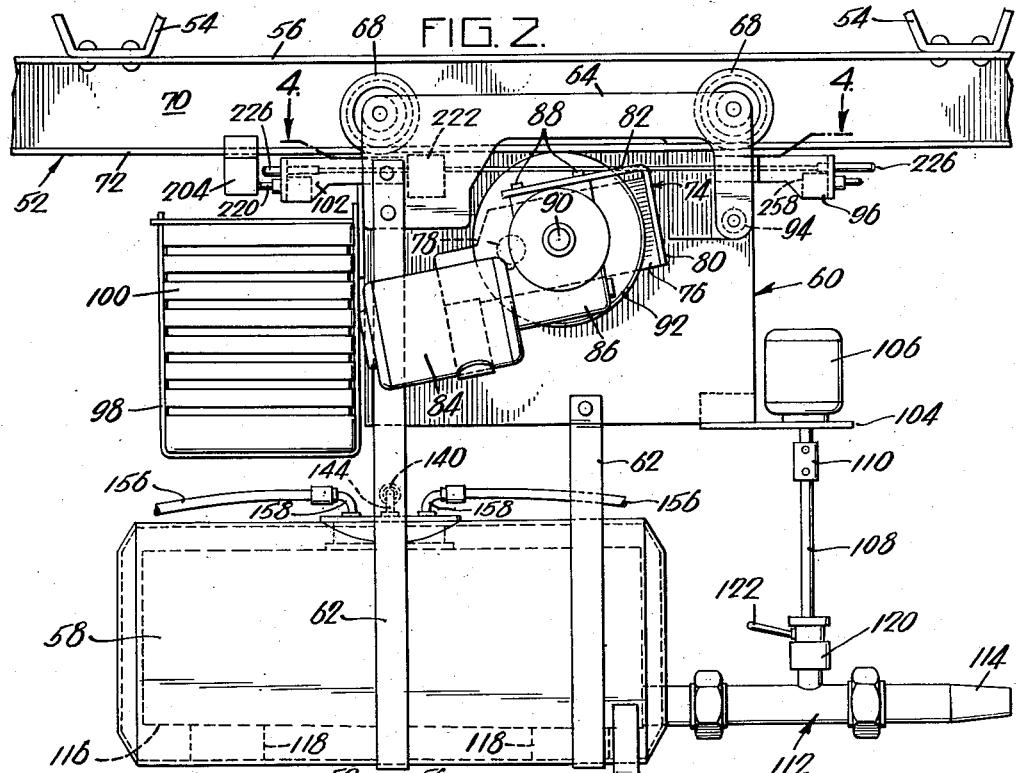
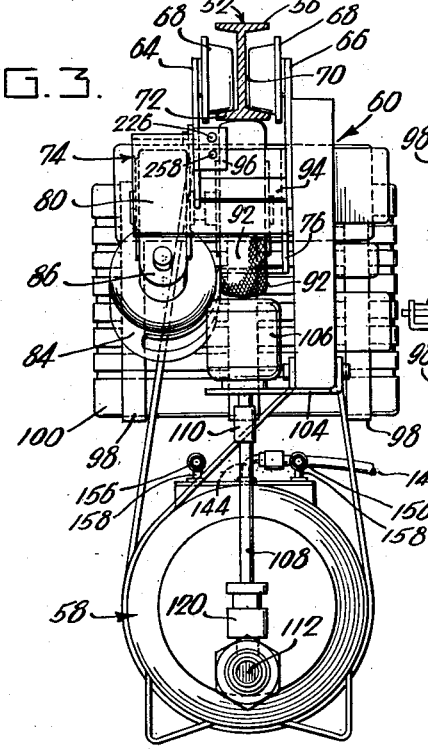
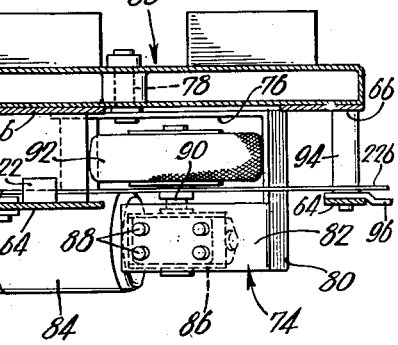
INVENTOR:
HARRY E. CANN, SR.
BY Howson & Howson
ATTYS Nov. 3, 1959 H. E. CANN, SR 2,910,965
MILKING SYSTEM FOR DOMESTIC ANIMALS
Filed Feb. 6, 1958 5 Sheets-Sheet 3

INVENTOR:
HARRY E. CANN, SR.
BY Howson & Howson
ATTYS.

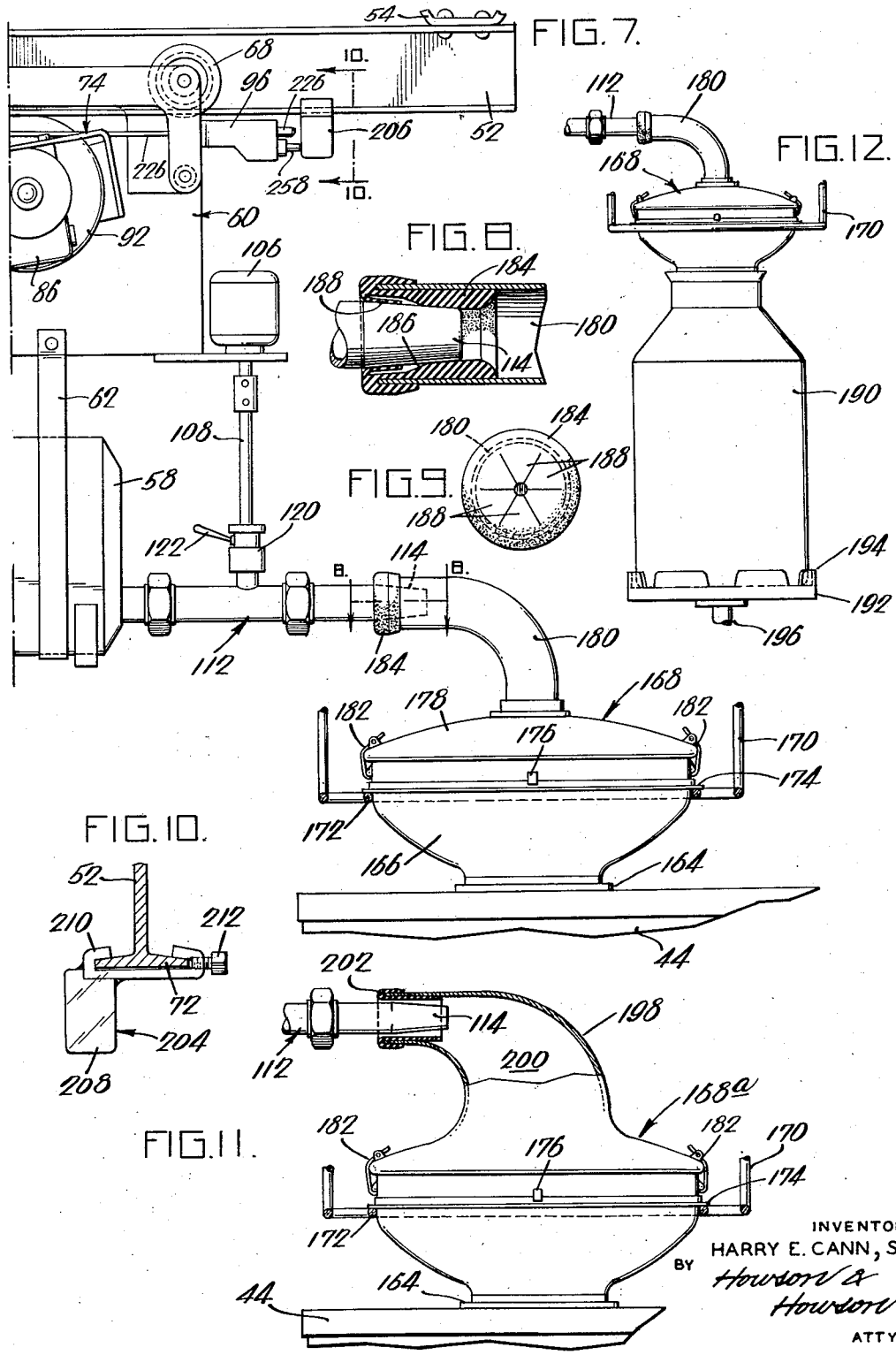

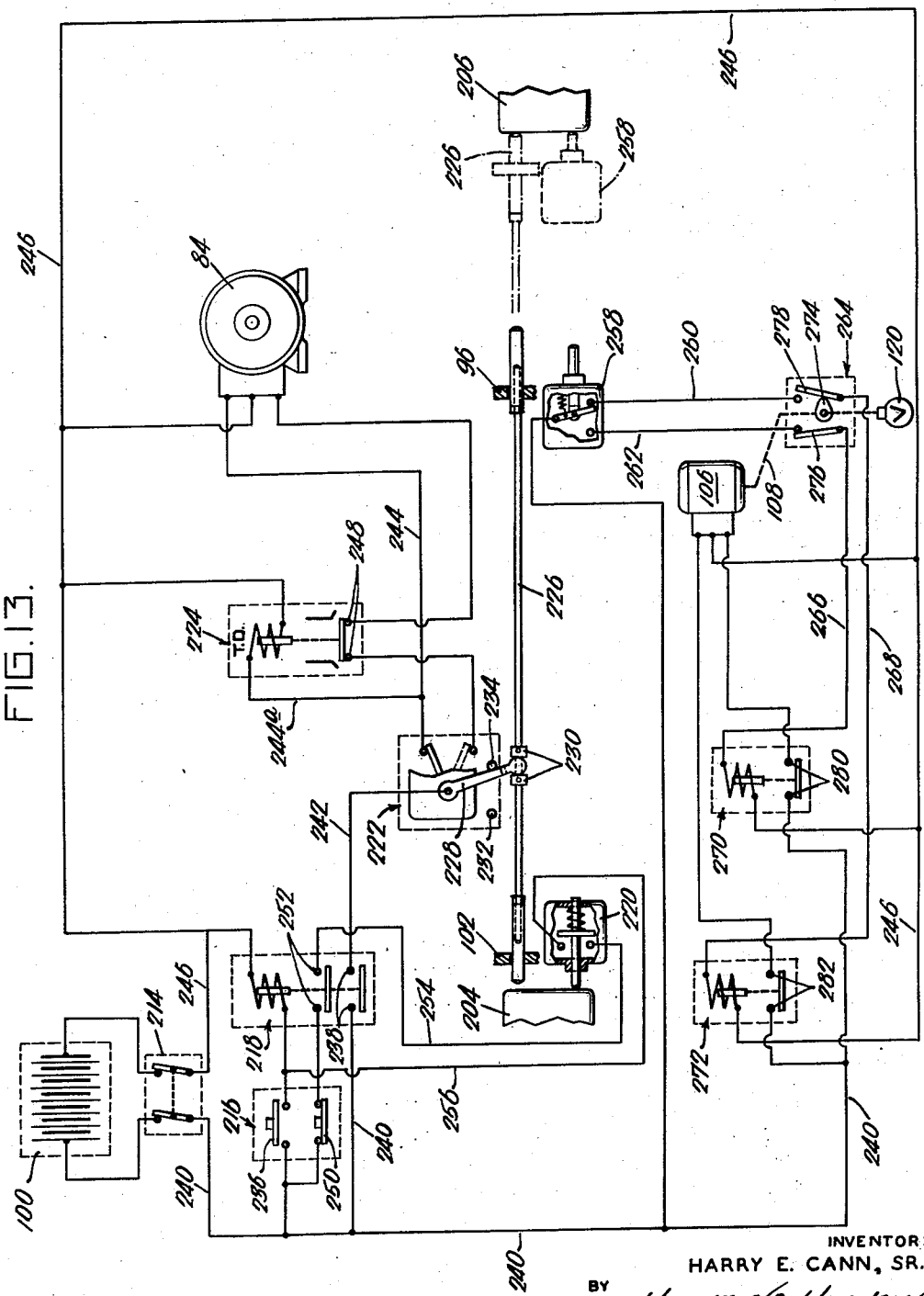

United States Patent Office 2,910,965
Patented Nov. 3, 1959

2,910,965

MILKING SYSTEM FOR DOMESTIC ANIMALS

Harry E. Cann, Sr., West Chester, Pa., assignor to Esco Cabinet Company, West Chester, Pa., a corporation of Pennsylvania Application February 6, 1958, Serial No. 713,606

16 Claims. (Cl. 119—14.11)

The present invention relates broadly to a milking system for domestic animals, and more particularly to a system adapted for use in milking parlors or stanchion barns utilizing the usual vacuum line installed in such establishments, and eliminating the use of milk lines for transporting milk from the milking locations to a milk room.

At the present time, pipe line milking systems are in widespread use which necessitate utilizing glass, stainless steel or plastic pipe lines to transport milk from the cow to the milk room, and thereafter release the milk into a container either in the nature of a can or a cooler. Such pipe lines are connected to vacuum pumps and the vacuum is used to draw the milk through the pipe. It has been found in practice, that this system and method has many disadvantages, including, among others:

(1) The pipe line with its many fittings and valves is extremely difficult to maintain clean and sanitary.

(2) The fittings and valves utilized are difficult to maintain leak-proof.

(3) Pipe line installations with sanitary stainless steel fittings are expensive to purchase and install.

(4) Pipe lines, fittings, ground joints and threads utilized are easily damaged, and costly and time consuming to replace.

(5) Surging action inherent in the use of vacuum has a tendency to cause milk to flake through a breaking-up action.

(6) Milk going through pipe lines, being subjected to the surging or breaking-up action, has been found to cause an objectionable odor in the milk, the exact reason for which is not known but possibly caused by a type of bacteria.

It is an object of the present invention to provide a milking system which will retain the benefits derived from pipe line milking systems, but which will overcome the aforementioned and other objectionable features inherent in such pipe line systems.

Another object of the present invention is to provide substantially the same service and results as pipe line systems, namely, to automatically deliver milk from a cow to containers in the milk room in the nature of cans or coolers, but to accomplish this without any milk pipe line and in a substantially fully automatic manner.

An additional object of the present invention is to provide a milking system adapted for easy and inexpensive installation in milking establishments already provided with vacuum lines, or where such vacuum lines can be readily installed.

In accomplishing the purposes and objects of the present invention, milk pipe lines are eliminated and replaced by a movable milk collector having a capacity to hold milk from a plurality of cows, and which is movably mounted on a conveyor so that it can be placed in front of the various milking locations in a milking establishment.

The movable milk collector is attachable to milking units including vacuum actuated pulsators with which are operatively associated usual and known types of claws and milking teat cups. Such milking units can be used singly and moved from location to location, or provided in plural numbers for simultaneous use on a plurality of cows, each discharging milk collected into the collector. Following collection of milk from one or a plurality of cows in the movable milk collector, the collector can be activated to move it along the conveyor, through suitable drive means, until it reaches a milk container in a milk room. Here automatic means operate to discontinue movement of the movable collector, and automatically empty the contents of the movable collector into containers in the nature of cans or coolers in the milk room. Thereafter means are automatically activated to return the movable collector in a reverse direction along the conveyor to any preselected desired position for milking of additional cows.

Another object of the present invention is to provide in the over-all system, simple and efficient mounting and conveying means for the movable collector, together with means for automatically actuating the various increments of the system in the manner described above.

An additional object of the invention is to provide in such a milking system portable milking units including pulsator, claw and teat cups which can be readily and easily connected with the movable milk collector through milk discharge and vacuum lines, incorporating detachable joints. The use of such portable units in conjunction with the disconnecting joints permits easy assembly or disassembly of the milking unit with the movable collecting unit, and facilitates ease of cleaning and sterilization of the various increments, while additionally facilitating ease of movement of the movable collector into desired positions and locations.

A further and important object of the invention is to provide a milking system which is substantially automatic in operation, and which operates on a preselected and set cycle of steps necessary to effect the desired over-all end results.

Additional objects and advantages of the present invention will be more readily apparent from the following detailed description of an embodiment thereof when taken together with the accompanying drawings in which:

Fig. 2 is a side elevational view of a movable collector utilized in the system and including support and operating means therefor;

Fig. 3 is an end elevational view of the structure of Fig. 2 taken at right angles thereto;

Fig. 4 is a fragmentary sectional view of the suspension and moving means for the movable can carriage taken on line 4—4 of Fig. 2;

Fig. 7 is a fragmentary elevational view showing structure for, and position of, discharge of milk from the movable collector into milk collecting means in a vacuum type system;

Fig. 8 is a sectional view taken on line 8—8 of Fig. 7;

Fig. 9 is an elevational view of milk receiving spout closure means for the system of Fig. 7;

Fig. 10 is a sectional view taken on line 10—10 of Fig. 7;

Fig. 11 is a fragmentary view of a modified form of collecting means operated under atmospheric conditions and pressure;

Fig. 12 is a fragmentary elevational view of a modified form for discharge into a milk can; and Fig. 13 is a schematic wiring diagram of an electrical circuit which can be utilized in the invention.

Figure 1:
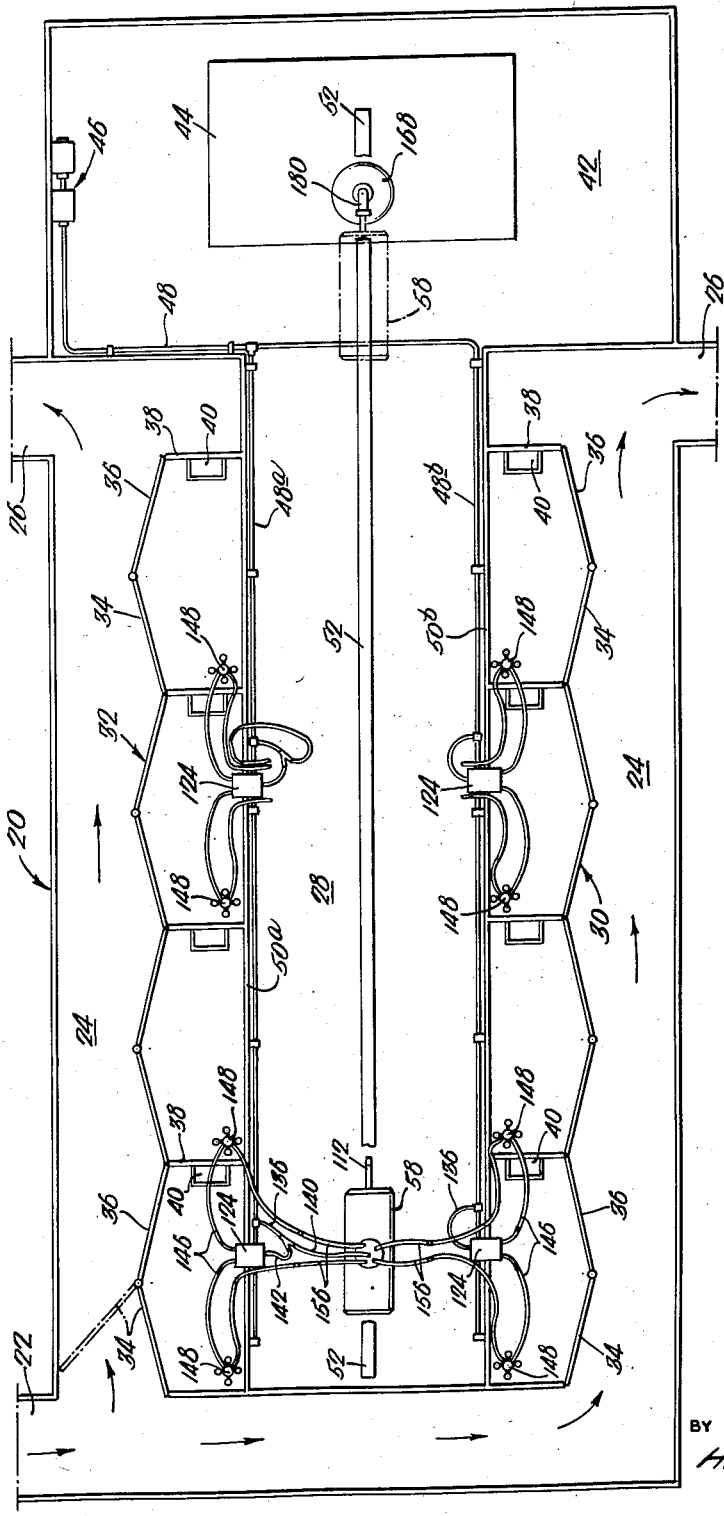
Fig. 1 is a schematic layout of the over-all system of the present invention.

Referring now in detail to the various figures of the drawings, in Fig. 1 there is schematically shown a milking installation of a milking parlor or comfort stall type, and which is used in this description merely as being illustrative since manifestly the invention is also applicable to stanchion barns or other installations. The building 20 is provided with an ingress openings 22 and two lanes 24 each terminating in outlet openings 26. A center work lane 28 separates two rows of stalls 30 and 32 each having, for purposes of illustration alone, four stalls, and each equipped with pivotally mounted ingress and egress gates 34 and 36, respectively. The individual stalls are separated by sides 38 and each stall is provided with the usual feed box 40 uniformly arranged in the same location in each stall.

A milk house or room 42 is located at one extreme end of the structure and opening into the center lane 28. In Fig. 1, at bulk or cold wall milk container 44 is located in milk room 42, although the invention is not limited thereto, since milk may be discharged into individual cans of a known construction or other type receptacles. A vacuum pump assembly 46 of a known type is installed in milk room 42, and a vaccum line 48 operatively connected therewith leads in two branches 48a and 48b along the inner sides of the two rows of stalls and can be operatively interconnected with or secured to rails 50a and 50b forming the inner sides of the stalls. Many milking installations in existence at the present time utilize such vacuum lines in conjunction with the individual milking stalls as is well-known. The structure hereinbefore described is well-known in the art and does not constitute a part of the present invention. Manifestly, many other types of installations are equally susceptible to association with, and use of, the present invention which will be described in more detail hereinafter.

For purposes of the present invention in such an above described establishment, an overhead track or trolley 52 extends lengthwise of the center work lane 28, from that end of the lane removed from the milk room and into the milk room, where it terminates in proximity to the container or tank 44. Preferably although not necessarily, this track 52 consists of an I beam supported by means of suspension members or brackets 54 secured to the upper flange 56 of the I beam. A movable milk container 58 is supported from a carriage generally designated 60 by means of straps 62 or the like. Spaced side plates 64 and 66 forming a portion of movable carriage 60 have tapered rollers 68 rotatably journaled thereon, on opposite sides of web 70 of track 52, in rolling engagement with lower flange 72 for movably supporting the carriage 60 and container 58 carried thereby.

A bracket 74 has a vertical plate portion 76 pivotally mounted at 78 on side plate 66. This bracket additionally has an end plate 80 extending outwardly from vertical plate 76, away from side plate 66, and additionally includes an overhanging top member 82 extending rearwardly from end plate 80. Drive means for the movable carriage are affixed to this pivotally mounted bracket 74 and includes a reversible electric motor 84 and interconnected reduction gear assembly 86, the casing of which is secured to upper plate 82 as at 88 by means of bolts or rivets. The output shaft 90 of the reduction gear assembly 86 has mounted thereon, a rubber tired wheel 92. The entire bracket 74 can pivot around the mounting at 78 and due to the weight of motor 84 and the positioning of the pivot 78, the weight of the motor or other device forces the rubber tired wheel 92 against the underside of track 52 in frictional and driving engagement therewith. If desired, additional spring means or the like can be utilized to insure a more positive engagement between the rubber tired wheel and the track 52.

As shown in Fig. 4 of the drawings, a bracing member 94 is interposed between side plates 64 and 66. An offset bracket 96 is connected to side plate 64 by interposition between the side plate and bracing member 94. This offset bracket is adapted for supporting actuating members for the carriage drive, as also milk discharge from movable container 58, as will be pointed out hereinafter. A suspension bracket 98 is fastened to the carriage 60 through the side plates and supports a battery 100 therein which is of a usual wet cell type and preferably 12 volts. The purpose of the battery is to provide motive power for drive motor 84 and other necessary components utilized in the present invention. A second offset bracket 102 is connected to the carriage through side plate 66 at the opposite end from the bracket 96 and also serves to support actuating means for various increments of the apparatus.

An angular bracket 104 is mounted on the carriage and serves to mount and support electric motor 106. The output shaft of the electric motor 106 is detachably connected with a valve actuating shaft 108 through the medium of a collar 110 or the like, which permits rapid connection or disconnection of the shaft 108. A discharge spout 112 is fastened to movable container 58 and opens into the interior thereof. It will be noted that this discharge spout 112 consists of a plurality of parts removably connected to one another and including a nose portion 114 which may be pointed as shown, if desired. The movable container 58 may include an inner container 116 mounted on supports 118 in spaced relationship to the outer shell or casing, and disposed at an angle in the casing whereby all milk contained therein will be discharged through discharge spout 112 when desired. A valve structure 120 is associated with the central portion of discharge spout 112, and is operable through shaft 108 or manually actuatable handle 122 for opening or closing to permit discharge of milk from inner container 116. The operation of this portion of the invention will also be described in detail hereinafter.

Figure 5:
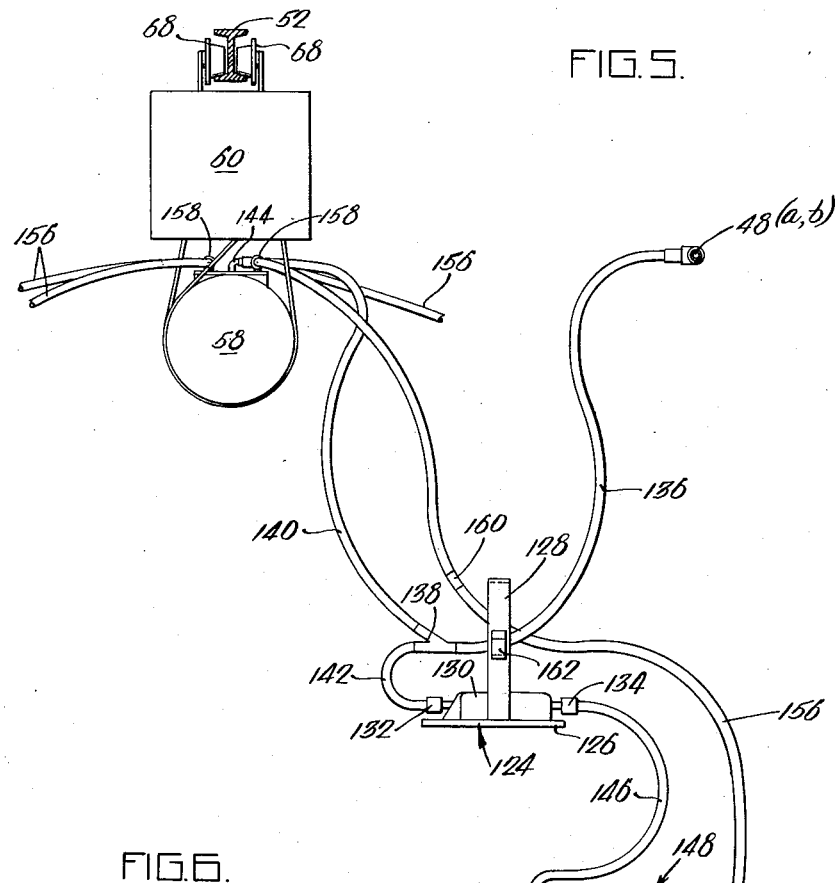
Fig. 5 is a schematic view of the portion of the system adapted for milking animals and discharging the milk into the movable collector.
Figure 6:
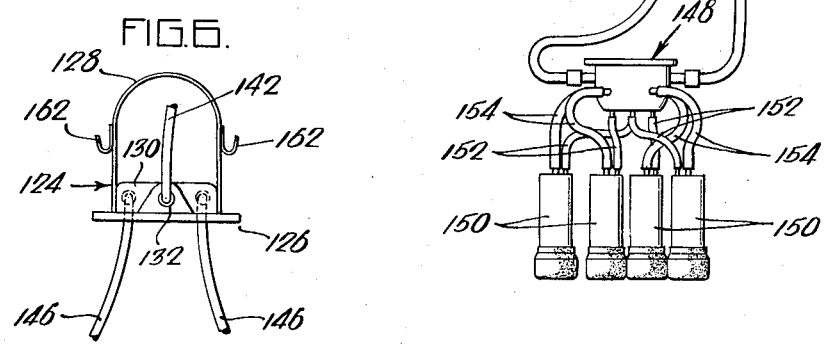
Fig. 6 is an elevational view of a portion of the portable milking units utilized in the system.

The movable container 58 is operatively associated with means for milking of cows and transmission of the milk into the inner container 116. These means include a portable pulsator unit 124 including a base 126 and a bale or handle 128 as shown in Figs. 5 and 6. A known-type of pulsator 130 is mounted on base 126 and incorporates a vacuum connection 132 and one or more air connections 134.

A vacuum hose 136 is adapted for connection with any stall cock connected into vacuum lines 48a or 48b, and is detachably connected to a Y joint 138 to which are connected vacuum hoses 140 and 142. The hose 140 is connected into the inner container 116 by means of a fitting 144 mounted on movable container 58. The hose 142 leads from the Y joint to the pulsator by connection with vacuum connector 132. An air hose 146 is connected with the pulsator 130 through air connector 134, and at the other end is detachably connected to milking claw 148 which includes a claw airbody therein. Four teat cups 150, of a usual type, are connected with claw airbody through hoses 152 whereby, upon actuation of pulsator 130, the proper milking action by teat cups 150 will take place. The teat cups 150 are connected by means of hoses 154 leading through the claw 148 to a milk discharge line 156 terminating directly in inner concontainer 116 for discharge of milk therein. This connection is by means of fittings shown at 158 and the milk is discharged directly into the inner container, being drawn through the line 156 due to the vacuum maintained in the container 116 by virtue of connection of the vacuum line 140. A detachable connector 160 is provided in milk line 156 to permit disassociation of various portions thereof.

It will be noted that by virtue of connectors such as at 132, 134, 138, 160, and the other fittings, that the individual sections and portions of the milking system can be easily and rapidly disconnected for movement and/or cleaning purposes. It will be seen from Figs. 1, 5 and 6 of the drawings that each pulsator unit 124 is adapted for use in milking of two adjacently positioned cows, and this is possible by virtue of two air lines 146 leading from the pulsator and two milk return lines 156 leading to inner container 116 whereby two sets of teat cup assemblies and claws can be utilized. The pulsator unit 124 is adapted for hanging on the bars forming the inner sides of the stalls adjacent to the center work lane as shown in Fig. 1, wherein two pulsator units are shown as connected into the movable conveyor 58, and a second pair is shown as mounted on the stalls but not in use at the time. Hooks 162 are provided on handle 128 of the pulsator unit over which the lines leading to the sets of teat cups can be hung for temporary storage when not in use, or when moving a pulsator unit.

Figs. 7, 8 and 9 of the drawings show the movable carriage and container in position for discharge of milk contained therein into a bulk milk container 44 of a vacuum type, and container inlet means mating with the nose portion 114 of discharge spout 112. The bulk milk cooler 44 has an opening in the top thereof surrounded by a fitting 164 adapted for sealing engagement with a lower portion 166 of a receiving fitting 168. This receiving fitting lower section 166 is substantially of an inverted bell shape, and engages in the opening in the top of the container 44 and may include if desired a strainer in the discharge outlet thereof. A mounting bracket 170 having a central circular ring 172 is adapted for vertical adjustment for positioning of the receiving fitting. A flange 174 on the receiving fitting rests on ring 172 and interengaging, locating and fixing brackets 176 are provided for positively positioning lower section 166 with respect to the ring. A removable lid 178 having an inlet pipe 180 is detachably secured on lower section 166 by means of clamps 182 which also position the inlet pipe 180 for mating with the discharge nozzle.

The outer end of inlet pipe 180 is provided with a bushing 184 of resilient material, and which is removably connected in the end of the pipe. As shown in Figs. 8 and 9, this bushing includes a tapering portion 186 of a shape adapted for sealing engagement with pointed nose portion 114 of spout 112. A plurality of resilient fins 188 form a closing diaphragm for the opening into the inlet pipe 180 when the spout is not in discharge engagement in the pipe. Due to the resiliency of the material, as the nose portion 114 enters the opening of inlet pipe 180, the fins are pushed back into the position shown in Fig. 8. This arrangement permits the use of vacuum type bulk milk coolers and movable containers in a wholly vacuum system.

In Fig. 12, the receiving fitting 168 is shown in milk discharging position with a milk can 190 of a usual type, and which is mounted on a platform 192 having a positioning flange 194 on the upper surface thereof. The base or platform 192 is supported on shaft 196 which preferably is associated with hydraulic, mechanical or other means for raising or lowering the same to permit positioning of the can 190 for proper coaction with the receiving fitting 168.

Fig. 11 shows a type of receiving fitting 168a for use in an atmospheric pressure discharge system. In this modification, the removable lid 198 has an enlarged inlet area 200 to permit milk to rapidly discharge from spout 112 without restriction. A bushing 202 is mounted in the outer end of the inlet opening but is of a size whereby it is maintained out of contact with the nose portion 114 so that there is no sealing engagement therebetween.

In operation, the movable carriage 60 is positioned on the track 52 in proximity to stalls in which cows are to be milked. Subsequent to milking the desired number of cows, dependent, of course, upon the capacity of the container and/or the desires of the operator, means are actuated to automatically move the carriage and movable container 58 along the track into the discharge position as shown in Fig. 7 of the drawings. Milk is thereupon automatically discharged into a container of any desired type in the milk room, and the carriage is then automatically actuated for reverse movement along the track into a position for milking of additional cows. The discharge and milking positions of the carriage are determined and limited by limit stops 204, at the loading position, and 206 at the discharge position. In Fig. 10 details of limit stop 204 are shown which include a depending portion 208 integral with a clamping portion 210 which is slidably engaged around the lower flange 72 of the I beam forming the track 52. A screw member 212 permits fixing of the position of the stop 204 at any desired position along the track to thereby determine the stopping position of the carirage and movable container at a desired milking location. The stop 206 is normally fixed at a position whereby accurate mating of spout 112 with the container inlet is possible.

The mode of operation of a control circuit which can be used for initiating traverse of the carriage from the loading station to the discharge point, and for automatically effecting this discharge and returning the carriage to its starting point, is best understood by reference to Fig. 13. Since the carriage in the present instance is self-propelled and provides its own source of power supply, the various components of the control circuit shown in the figure may be considered as being suitably contained on the carriage structure. Once the starting cycle is initiated, however, the carriage traverse and discharge functions are under control of the carriage limit stops 204 and 206 described earlier and shown schematically in Fig. 13.

Battery 100 indicates the source of current supply under control of a main switch 214. The motor circuit for traversing the carriage includes start and stop switch 216, relay 218, normally closed limit switch 220, reversing switch 222, time delay relay 224 and reversible motor 84. Reversing switch 222 is a two-pole over-center type and is operatively associated with a push-rod 226 by means of an operator arm 228 having a bifurcated end which embraces said push-rod between a pair of spaced collars 230, 230 on the rod. The arm 228 has limited movement between stops 232, 234 associated with the switch 222 and is biased to either of these positions by a spring (not shown) which is part of the conventional over-center mechanism of the switch 222. These stops in effect, limit the movement of the push-rod 226, which is loosely carried in supporting brackets 96, 102 on the carriage structure.

In the relative positions indicated in the diagram, the carriage is presumed to be at a loading station. Therefore carriage limit stop 204 has deenergized the motor circuit and the carriage is in a position of rest. It should be noted, as explained previously, that the limit stop 204 is adjustable on the carriage track 52 depending on the point of loading, while stop 206 is ordinarily fixed unless it be desired to change the point of discharge.

Assuming that it be desired to remove the carriage to the discharge station, the start button 236 of switch 216 is depressed energizing the relay 218 and closing the drive motor circuit through relay contacts 238 from battery connection 240, through line 242 to switch 222 and the line 244 to drive motor 84. Connections to line 246 from the battery complete the circuit. Relay 224 is simultaneously energized by way of line 244a opening the normally closed contacts 248 of that relay. As the carriage, now under power, moves away from the limit stop 204 the start button 236 may be released as a hold-in circuit for relay 218 takes over upon closure of the contacts of the normally closed switch 220. This circuit includes normally closed stop switch 250, relay contacts 252, line 254, switch 220, and line 256 to the coil of relay 218. Coil connections to line 246 of the battery completes the circuit. Interruption to the normal cycle of operation, now initiated, may be made at any time by operating stop switch 250.

Upon reaching the point of discharge as prescribed by the position of carriage limit stop 206, push-rod 226 associated with the reversing switch 222 will first be contacted by the said stop, and move the arm 228 to the left as viewed in Fig. 13 until an over-center position is reached at which time the switch will be actuated to the dotted line position shown, thus opening the motor circuit and resetting the circuit to the motor reverse drive position. The coil of the time delay relay 224 is deenergized simultaneously, thereby starting the run-out period prescribed for the relay. With the carriage immobilized and assumed to be in discharge position, this condition will obtain until such time as the relay 224 reestablishes the circuit to the motor through the closed contacts 248.

Since the first part of the movement of the push-rod 226 upon contact with stop 206 is necessary to condition the switch 222 for operation, a second switch 258 is operated by the said stop immediately thereafter, said switch being effective to operate the valve 120 for discharging the contents of the carriage tank 116.

The valve control circuit includes the connection to battery through line 240 to switch 258, connections 260 and 262 to switch 264, connections 266 and 268 to relays 270 and 272 respectively and valve operating motor 106. Other connections from the relays and motor complete the circuit to the battery through line 246.

The motor 106 is a fractional revolution reversible type, directly connected to the valve operating spindle indicated schematically at 108, and operates to open or close the discharge valve of the carriage tank by a rotative movement of approximately 180°. A cam 274 also associated with the spindle 108 operates to selectively actuate the contactors 276 and 278 of the switch 264 in response to the positioning of the valve spindle. In the position shown in Fig. 13 the valve is presumed to be closed. However, upon contact of the operating plunger of switch 258 with limit stop 206 which signals the arrival of the carriage at the discharge point, switch 258 reverses its contacts and closes the battery circuit from line 240 through switch 258, line 262, contactor 276 of switch 264, line 266 to the coil of relay 270. The circuit to relay 270 is completed through connection to battery lead 246. Relay 270, thus energized, closes its contacts 280 and energizes motor 106 by establishing connection with battery lead 240. Actuation of the motor 106 results in rotation of the valve spindle 108, opening said valve and rotating the cam 274 associated therewith from the position shown in Fig. 13 to a position 180° removed therefrom wherein the contactor 276 will be moved to open the circuit established through switches 258 and 264 to relay 270, thus dropping out the relay 270, with the resultant opening of the valve motor circuit, through the contact 280 of said relay. Simultaneously contact 278 of switch 264 closes preparatory to establishing a circuit to relay 272 for the purpose of closing said tank discharge valve upon removal of the carriage from this position.

This occurs as the time delay relay 224 runs out, and energizes the motor 84 through the contacts 248 of said relay thus initiating the return traverse of the carriage. As the carriage moves away from the limit stop 206, switch 258 reverses and through the now closed contactor 278 of switch 264 energizes the coil of relay 272. Immediately a circuit is closed through its contacts 282, reversing the motor 106 and effecting closure of the tank valve 120, and the cam 274 thereupon returning to the position illustrated in Fig. 13 moves the contactor 278 of switch 264 to a position opening the circuit to relay 272 permitting the contacts 282 of said relay to open and break the circuit to valve motor 106.

Meanwhile the carriage will be moving toward the limit stop 204 until contact of the push-rod 226 with said limit stop opens the circuit to the drive motor 84 by reversing the over-center switch 222, and by actuating switch 220 to drop out the hold-in circuit of the starting relay 218 thereby deenergizing the drive motor circuits. Accordingly, the carriage comes to rest with the various components in the positions as illustrated in Fig. 13.

The cycle described above may be repeated at any time upon depression of the start button 236 of the switch 216.

While in the foregoing description, a motor has been described for operation of the discharge valve, it is not necessary that the invention be restricted thereto since a solenoid actuated valve or other mechanisms could be used, or the valve can be manually operated. Additionally while specific embodiments of circuit means and actuating means for the various elements of the over-all system have been described, other circuits and systems might be devised and utilized in the invention.

The movable container shown in the drawings is adapted for containing insulation between the inner container and outer casing and, if desired, water cooling circulation or other cooling means could be utilized for rapid cooling of the milk following the milking operation. Obviously, in some installations the inner container might be omitted.

Other changes in details will be readily apparent to those skilled in the art to which the invention pertains without departing from the spirit and scope thereof as defined in, and limited solely by, the appended claims.

I claim:

1. An automatic milking system for milking establishments having a milk storage container and a plurality of milking locations, comprising a movable milk collector adapted to receive milk selectively at a plurality of said milking locations, a conveyor mounting said milk collector, means operatively associated with said collector and said conveyor for moving said milk collector on said conveyor to a selected said milking location and also operable upon actuation to automatically move said milk collector on said conveyor to said milk storage container, stop said milk collector, effect discharge of milk therefrom into said milk storage container and thereafter return said milk collector along said conveyor to a preselected one of said milking locations.

2. An automatic milking system for milking establishments as claimed in claim 1, and wherein said establishment has a common vacuum line extending to all said milking locations, a portable milking unit including a vacuum actuated pulsator and claws and teat cups operatively connected thereto, and milk discharge and vacuum lines detachably connecting said milk collector and said unit including disconnecting joints in said lines.

3. An automatic milking system for milking establishments as claimed in claim 2, said milk collector including a receptacle, and a plurality of milk discharge and vacuum line fittings connected into said receptacle for connecting said milk collector to a plurality of said portable milking units for simultaneous milking at a plurality of said milking locations.

4. An automatic milking system for milking establishments as claimed in claim 1, said conveyor for said milk collector including an overhead track, a carriage having rollers movably suspended from said track, said milk collector including a receptacle for milk carried by said carriage, an electric motor mounted on said carriage, a drive wheel connected to said motor and in contact with said track and a self-contained electric energy source on said carriage for operation of said motor for said movement of said milk collector.

5. An automatic milking system for milking establishments as claimed in claim 4, said electric motor being reversible, an electric circuit interconnecting said electric motor and said source, and switches in said circuit operable for energizing said motor to drive said carriage in one direction, automatically stop movement at a predetermined end position in proximity to said storage container, and return said carriage to a preselected position.

6. An automatic milking system for milking establishments as claimed in claim 5, time delay means in said circuit operable for maintaining said carriage stopped in proximity to said storage container for a predetermined period of time to effect milk discharge from said collector into said storage container and thereafter permit return to said preselected position.

7. An automatic milking system for milking establishments as claimed in claim 6, a discharge spout for said receptacle, valve means in said spout, electrical actuating means for said valve means connected into said circuit, and control means for said actuating means carried on said carriage and automatically operable following stopping of said carriage in milk discharging position to open said valve means and after a predetermined time interval close said valve means prior to return movement of said carriage.

8. An automatic milking system for milking establishments as claimed in claim 7, limit stops mounted on said overhead track, one in fixed position at said storage container location and another adjustably mounted to determine a carriage stopping position for the return position after milk discharge, actuating means for said switches mounted on said carriage operable for automatically stopping said carriage at milk discharging and return positions operable upon contact with said limit stop means.

9. An automatic milking system for milking establishments as claimed in claim 1, said milk collector including a receptacle, a movably mounted carriage suporting said milk collector, a discharge spout on said collector, a nose portion on said discharge spout, and said storage container having container inlet means adapted for automatic mating with said spout nose portion when moved into milk discharge position.

10. An automatic milking system for milking establishments as claimed in claim 9, said storage container having a detachable lid thereon, said container inlet means comprising a portion of said lid, and means on said container for relative positioning thereof and said lid to insure proper mating of said nose portion and container inlet means.

11. An automatic milking system for milking establishments as claimed in claim 10, a mounting bracket for said storage container, said mounting bracket being vertically adjustable for vertical adjustment of said container inlet means, said positioning means including locating and fixing brackets on said mounting bracket and coacting means on said container.

12. An automatic milking system for milking establishments as claimed in claim 11, a resilient bushing in the opening of said container inlet, said bushing including a tapering portion adapted for sealing engagement with said nose portion of said discharge spout and a plurality of resilient fins adjacent the front edge of said bushing forming a closing diaphragm for said inlet when said spout is disengaged therefrom.

13. An automatic milking system for milking establishments as claimed in claim 9, said storage container inlet means including a receiving fitting adapted for engagement in the container opening and consisting in an inverted bell shape lower section and a removable lid having an inlet opening therein.

14. An automatic milking system for milking establishments as claimed in claim 13, said removable lid having an enlarged inlet area to permit milk to rapidly discharge therein from said discharge spout.

15. In a milking system for milking establishments having a plurality of milking locations and a common vacuum line extending to said locations, a conveyor extending in proximity to said locations, a movable milk collector movably mounted on said conveyor for selective placement at a said location, self-contained drive means associated with said collector for moving said collector, and a portable milking unit detachably connectable to said collector, and said vacuum line for extracting milk from an animal and discharging it into said collector.

16. An automatic milking system for milking establishments as claimed in claim 1, a receptacle in said milk collector, a discharge spout for said receptacle, valve means in said spout, actuating means for said valve means and means for controlling said actuating means carried on said collector and automatically operable following stopping of said milk collector in milk discharging position to open said valve means, and close said valve means upon return movement of said collector.

References Cited in the file of this patent

UNITED STATES PATENTS

| 1,603,429 | Uphaus et al. | Oct. 19, 1926 |
| 2,685,863 | Martin | Aug. 10, 1954 |

FOREIGN PATENTS

| 705,151 | Great Britain | Mar. 10, 1954 |